United States Patent [19]

Welch

[11] 4,330,648

[45] May 18, 1982

[54] CATALYST AND PROCESS OF POLYMERIZATION OF ALPHA-MONOOLEFINS

[75] Inventor: M. Bruce Welch, Bartlesville, Okla.

[73] Assignee: Phillips Petroleum Company, Bartlesville, Okla.

[21] Appl. No.: 860,262

[22] Filed: Dec. 13, 1977

[51] Int. Cl.$^3$ .......................... C08F 4/02; C08F 10/00
[52] U.S. Cl. ............................. 526/125; 252/429 B; 526/114; 526/153; 526/351
[58] Field of Search ................................ 526/114, 125

[56] References Cited

U.S. PATENT DOCUMENTS

| | | | |
|---|---|---|---|
| 3,219,648 | 11/1965 | Hill | 526/142 |
| 3,642,746 | 2/1972 | Kashiwa et al. | 526/125 |
| 3,669,948 | 6/1972 | Konotsune et al. | 526/142 |
| 3,888,835 | 6/1975 | Ito et al. | 526/125 |
| 4,234,710 | 11/1980 | Moberly et al. | |

FOREIGN PATENT DOCUMENTS

| | | |
|---|---|---|
| 2633195 | 1/1977 | Fed. Rep. of Germany . |
| 50-80445 | 3/1975 | Japan . |
| 800447 | 8/1958 | United Kingdom . |
| 885869 | 12/1961 | United Kingdom . |
| 1286867 | 8/1972 | United Kingdom . |
| 1335887 | 10/1973 | United Kingdom . |
| 1387890 | 3/1975 | United Kingdom . |

*Primary Examiner*—Edwrd J. Smith

[57] ABSTRACT

Polymerization of alpha-monoolefins employing a catalyst comprising (A) a milled admixture of a titanium halide, anhydrous magnesium or manganous chloride, optionally a Lewis base, and (B) a dihydrocarbylaluminum halide, a dihydrocarbylaluminum hydride, and an ether-alcohol.

28 Claims, No Drawings

CATALYST AND PROCESS OF POLYMERIZATION OF ALPHA-MONOOLEFINS

FIELD OF THE INVENTION

The invention relates to a titanium based catalyst system. In another aspect, the invention pertains to a process for the polymerization of alpha-monoolefins.

BACKGROUND OF THE INVENTION

In the field of polymerization of alpha-monoolefins, such as propylene, or ethylene, to produce useful polymers, a continuing objective is an increase in productivity relative to the amount of catalyst employed. Productivity is highly important in order to keep to a minimum the amount of residual catalytic materials to be removed from the resulting polymer which is almost always a necessity, and generally is a troublesome or relatively expensive procedure to carry out.

In another aspect, normally the desired polymer is a solid polymer, and minimization of the formation of "solubles", i.e. amorphous or atactic polymer, is a much to be desired objective. Most amorphous polymer is considered an undesirable byproduct, which either degrades the character of the total product, or else must be removed by treating with such as hexane, to recover the more valuable solid polymer for exploitation.

Thus, it is desired to provide polymerization processes, and catalysts, effective in improving the productivity of the polymerization of alpha-monoolefins, and also to minimize the formation of solubles.

BRIEF DESCRIPTION OF THE INVENTION

I have discovered a catalyst system and a process of polymerization of alpha-monoolefins employing the catalyst, in which the catalyst comprises, and preferably consists essentially of two components, (A) a component formed by the intensive milling of a titanium halide, anhydrous magnesium or manganous chloride, and optionally though preferably a Lewis base, and (B) an ether-alcohol, and two organoaluminum compounds, which are at least one each of a dihydrocarbylaluminum halide and a dihydrocarbylaluminum hydride. My catalyst and process are effective in the polymerization of aliphatic alpha-monoolefins either in homopolymerizations, or in copolymerizations.

DETAILED DESCRIPTION OF THE INVENTION

Monomers

In the polymerization process in accordance with one aspect of my invention, my catalyst is effective for the polymerization of aliphatic alpha-monoolefins (1-monoolefins) polymerizable with titanium-based catalyst systems. These aliphatic 1-monoolefins can be represented by $RCH=CH_2$ in which R is hydrogen or an alkyl radical. It is presently preferred, as a matter of availability and not a limitation on operability of my process, to employ the 1-monoolefins of 2 to 8 carbon atoms per molecule, though 1-monoolefins of greater numbers of carbon atoms also can be polymerized in accordance with my process.

Exemplary 1-monoolefins include ethylene, propylene, butene-1, isobutylene, 3-methylbutene-1, pentene-1, hexene-1, octene-1, decene-1, and the like, alone, or in admixture. Propylene is a presently preferred monomer.

Catalyst System

My catalyst system comprises a two-component system (A) an intensively milled admixture of at least one titanium halide, anhydrous magnesium or manganous chloride or both, and optionally though preferably at least one Lewis base, and (B) two organoaluminum compounds and at least one ether-alcohol. The two organoaluminum compounds are at least one each of a dihydrocarbylaluminum halide and a dihydrocarbylaluminum hydride. More preferably, my catalyst will consist of (A) an intensively milled admixture of a titanium halide, anhydrous magnesium or manganous chloride, a Lewis base and (B) at least one dihydrocarbylaluminum halide, at least one dihydrocarbylaluminum hydride, and at least one ether-alcohol.

Component (A)

The titanium halide can be any of the di, tri, or tetrahalides of titanium wherein the halogen can be bromine, chlorine or iodine. These can be represented by $TiX_{4-n}R'_n$, wherein X is the halogen, usually chlorine or bromine; R' is alkyl, cycloalkyl, cycloalkoxy, aryl, aryloxy, or alkoxy, or combinations of 2–8 carbon atoms; and n is 0 or an integer of 1 to 3. Exemplary species include titanium tetrachloride, trichloro-n-octyltitanium, trichlorophenoxytitanium, tribromocyclohexyltitanium, trichlorohexyloxytitanium, dibromodimethyltitanium, iodotriethoxytitanium, and the like, alone, or in admixture. Presently preferred is titanium tetrachloride because of its ready availability and relatively low cost.

Lewis Base

The Lewis base can be any of the compounds meeting the commonly accepted definition of a Lewis base, otherwise described as an electron donor compound.

Generally, any of the amines, amides, ethers, carboxylic acids, esters, ketones, nitriles, phosphines, or the like, known as Lewis bases, are suitable. The Lewis base can be, for example, selected from aliphatic carboxylic acids, aromatic carboxylic acids, alkylesters of aliphatic carboxylic acids, alkylesters of aromatic carboxylic acids, aliphatic ethers, aromatic ethers, aliphatic ketones, aromatic ketones, aliphatic aldehydes, aliphatic alcohols, aromatic alcohols, aliphatic acid halides, aliphatic nitriles, aromatic nitriles, aliphatic amines, aromatic amines, aliphatic phosphines, aromatic phosphines, amides, those of mixed character, and the like, alone or in admixture.

Exemplary amines represented by $R^2NH_2$, $R_2^2NH$, and $R_3^2N$, include triethylamine, triphenylamine, diphenylamine, and the like. Exemplary amides represented by $R^2CONH_2$ and $R^2CONHR^2$ include acetamide, butyramide, acetanilide and the like. Exemplary carboxylic acids represented by

are acetic acid, benzoic acid, and the like, as well as the esters

Exemplary ethers represented by $R^2OR^2$ include dimethyl ether, diethyl ether, dicyclohexylether, ethylbutylether, diphenyl ether, and the like. Exemplary ketones represented by

include acetone, methyl n-butyl ketone, acetophenone, and the like. Exemplary nitriles represented by $R^2CN$ include acetonitrile, isobutyronitrile, benzonitrile, and the like. Exemplary phosphines represented by

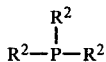

and

include tributylphosphine, propyl-(n-pentyl)phosphine, triphenylphosphine, and the like. $R^2$ is a hydrocarbon group and is alkyl, cycloalkyl, or aryl, preferably of 1 to 12 carbon atoms per group.

Presently preferred are the esters, and most preferred are the esters of aromatic carboxylic acids wherein the moiety derived from the alcohol is an aliphatic moiety, because the resulting catalysts exhibit high activity and good stereospecificity in polymerizing the monomers. These preferred esters can be represented by the formula:

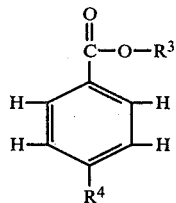

In the above formula, $R^3$ represents an alkyl group, preferably of 1 to 4 carbon atoms, $R^4$ represents a para-substituent on the ring and is a monovalent radical selected from —F, —Cl, —Br, —I, —OH, —$OR^2$, —$OOCR^2$, —SH, —$NH_2$, —$NHR^2$, —$NR_2^2$, —NH$COR^2$, —$NR^2COR^2$, $NO_2$, —CN, —CHO, —$COR^2$, —$COOR^2$, —$CONH_2$, —$CONR_2^2$, —$SO_2R^2$, and —$CX'_3$ wherein $X' = F$, Cl, Br, I, or hydrogen.

Exemplary esters include ethyl benzoate,
ethyl anisate (p-methoxybenzoate), ethyl p-dimethylaminobenzoate,
ethyl p-fluorobenzoate, ethyl p-cyanobenzoate, methyl benzoate,
isopropyl p-diethylaminobenzoate, butyl p-fluorobenzoate,
n-propyl p-cyanobenzoate, ethyl p-trifluoromethylbenzoate,
methyl p-hydroxybenzoate, ethyl-p-methoxycarbonylbenzoate,
methyl p-acetylbenzoate, isopropyl p-formylbenzoate, methyl p-nitrobenzoate,
ethyl p-carbamoylbenzoate, methyl p-mercaptobenzoate, methyl p-chlorobenzoate, n-butyl p-bromobenzoate, isopropyl p-iodobenzoate, ethyl p-aminobenzoate, n-propyl p-methylaminobenzoate, methyl-p-acetamidobenzoate,
n-butyl p-formylbenzoate, dimethyl terephthalate,
ethyl p-(N,N-dimethylcarbamoyl)benzoate, n-propyl p-(methylsulfonyl)benzoate,
methyl p-trifluoromethylbenzoate, ethyl p-acetoxybenzoate, and mixtures.

Presently preferred of the Lewis bases are the esters, and of these presently preferred are ethyl benzoate or ethyl anisate, since particularly highly active catalysts are produced therewith which exhibit very good stereospecificity in polymerizing the 1-monoolefins described previously.

Magnesium or Manganous Chlorides

Magnesium or manganous chloride, or both, in the first component of my catalyst system, are employed in the substantially anhydrous form. Presently, magnesium chloride is preferred because of ready availability, low cost, low toxicity, and because more active catalysts are formed in its presence.

Preparation of Component (A)

The anhydrous magnesium chloride, manganous chloride, or both, are employed dry or dried, and in the form of a finely divided powder. The magnesium or manganous chloride can be preactivated by a grinding operation prior to the milling step used to form component (A), though such preactivation is not considered generally necessary.

The ratio of the magnesium or manganous chloride, or both, to the titanium compound can range widely, as may be desired, as long as the final catalyst is effective, though presently considered exemplary is a molar ratio of manganous chloride or magnesium chloride:titanium compound in the range of about 4:1 to 40:1, presently preferred about 5:1 to 20:1 because catalyst activity is particularly good in that range.

While the ratio of the components in forming the first component (A) of my catalyst system can range widely, as long as the final catalyst is effective, presently considered exemplary is a molar ratio of titanium halide:Lewis base in the range of about 0.5:1 to 4:1, presently preferred about 0.7:1 to 2:1 because stereospecificity is more favored, especially when polymerizing propylene.

Usually, the anhydrous magnesium chloride or manganous chloride is added to the milling means prior to addition of the titanium compound, and the optional Lewis base, of Component (A), though the order of addition is not critical.

The Lewis base, where employed, and the titanium halide can be charged separately to the milling means, or can be premixed together to form an admixture, which may form an addition compound or complex of a Lewis base with the titanium compound, and this then can be charged to the milling means.

The components for catalyst component (A) are admixed in a suitable milling means under intensive milling conditions. The milling employed is to be distinguished from ordinary admixing, shaking, or tumbling, or the like. The milling refers to the strong and thorough mixing of the several ingredients together, milling under milling conditions, in such a manner as to afford significant reduction in the particle size. Milling can be by means of a ball mill, vibrating ball mill, tower mill, or the like. A typical specific mill employable is a vibratory mill such as a Vibratom, manufactured by Siebtechnic GMBH.

Milling can employ ambient vacuum or other subatmospheric, or superatmospheric pressure, in an inert, dry atmosphere such as nitrogen, argon, or the like. Milling may result in heat being produced, and where needed cooling means can be employed to avoid excessive temperatures over such as about 150° F. (65° C.) which may adversely affect catalyst performance. Milling times can range widely, such as from about 5 to 200 hours, presently preferred about 10 to 175 hours because the catalysts are sufficiently activated after such milling times. No advantage in activity is gained by exceeding the specified times. Vibratory milling typically takes a shorter time. Roll milling typically takes a longer time.

Component (B)

Component (B) comprises two dihydrocarbyl aluminum compounds, and an ether-alcohol. One of the organoaluminum compounds is selected from the dihydrocarbylaluminum halides and one is selected from the dihydrocarbylaluminum hydrides.

The dihydrocarbylaluminum compounds of component (B) can be represented by the formula $AlR_2{}^5X'$ where each $R^5$ is the same or different alkyl radical, preferably containing 1 to 12 carbon atoms per $R^5$ radical and $X'$ is halogen or hydrogen. Exemplary organoaluminum compounds include dimethylaluminum bromide, diethylaluminum chloride, diisopropylaluminum iodide, diisobutylaluminum hydride, di-(2-ethylhexyl)aluminum chloride, di-n-dodecylaluminum hydride, and the like. Presently preferred organoaluminum compounds are diethylaluminum chloride and diisobutylaluminum hydride.

The ether-alcohol of component (B) is a monoalkyl ether of ethylene glycol or diethylene glycol. The alkyl group in the ether-alcohol compounds preferably contains 1 to 4 carbon atoms per molecule. Exemplary ether-alcohol compounds include 2-methoxyethanol, 2-ethoxyethanol, 2-n-butoxyethanol, 2-(2-methoxyethoxy)ethanol, 2-(2-ethoxyethoxy)ethanol, 2-(2-n-butoxyethoxy)ethanol, and mixtures. Presently preferred is 2-(2-n-butoxyethoxy)ethanol, also known as butyl carbitol or diethyleneglycol mono-n-butyl ether.

Catalyst Component Ratios

The atom ratios of aluminum in the dihydrocarbylaluminum hydride plus the dihydrocarbylaluminum halide to titanium can range from about 10:1 to 250:1, preferably about 25:1 to 150:1.

The mole ratios of dihydrocarbylaluminum hydride plus dihydrocarbylaluminum halide to the ether-alcohol can range from about 0.5:1 to 10:1, preferably about 1:1 to 5:1.

Polymerization Conditions

The catalyst components can be individually charged to the polymerization reaction zone in any order, or can be premixed prior to charging. Generally, however, component (B) is charged first, followed by addition of hydrogen, if used, and a substantial portion of monomer. Component (A) then is added, the reactor and contents are brought to the desired reaction temperature, and polymerization is carried out for the desired length of time. When liquid phase conditions are employed, sufficient monomer is intermittently charged to the reactor as required to maintain a liquid full condition.

Polymerization can be carried out under conditions known in the art, such as in a liquid phase in the presence or absence of a diluent substantially inert under the reaction conditions employed, or reactions can be carried out in the vapor phase.

It presently is preferred to polymerize propylene in liquid propylene in the absence of an inert diluent because separation of components is simplified and good results are obtained.

Ethylene presently is preferably polymerized in a diluent, though other alpha-monoolefins conveniently need not be. Typical suitable diluents include n-butane, isobutane, pentane, n-hexane, n-heptane, n-octane, cyclohexane, methylcyclohexane, and the like, or other aliphatic hydrocarbons, alone, or in admixture.

Polymerization temperature employed can range widely, as convenient and desirable for the equipment, monomer, and the like. Exemplary temperatures of polymerization lie in the range of about −80° C. to 150° C., presently preferred about 15° C. to 100° C. Polymerization temperatures can vary somewhat depending on the particular monomer, employment of diluent, and the like. For example, the polymerization of propylene in liquid propylene is conveniently carried out in the range of about 24° C. to 80° C., presently preferred about 49° C. to 71° C. because of better results with regard to polymer productivity and low solubles.

Polymerization pressures can range widely, as convenient, depending on whether vapor phase or liquid phase conditions are employed, whether diluent is employed, and the like. Where liquid phase operation is desired, with or without diluent, the pressure employed should be sufficient to maintain reactants and diluent substantially in the liquid phase.

Control of the molecular weight of the polymeric product can be exerted by maintaining small amounts of hydrogen during polymerization, and this normally is considered advantageous. The presence of hydrogen tends to decrease the molecular weight of the polymeric products.

The polymerization process can be carried out either continuously, or batchwise, as may be convenient depending on desired output, equipment, and the like.

The amount of catalyst employed in the polymerization conveniently can be related to the amount of component (A) employed.

The amount of my catalyst component (A) employed relative to the reaction mixture can vary from about 0.01 to 1 wt. %. Generally, about 0.001 to 0.01 are employed in polymerizing propylene in liquid propylene, for example. The term "reaction mixture" includes the polymerization charge of monomer and diluent, if any.

Of course, the catalyst components employed are, to some extent, sensitive to poisons, such as water, air and the like. Equipment, diluent, alpha-monoolefins, and the like, all should be maintained in substantially anhydrous conditions, or dried prior to employment. An atmosphere inert to the components should be employed, such as nitrogen, argon, helium, n-hexane, and the like. Polymerization starts almost immediately on combination of the catalyst components with the monomer and is substantially complete generally within about 2 hours.

After completion of the polymerization reaction, or after suitable residence time in the reaction zone to obtain desired conversion, the contents of the reactor means then are discharged. The catalyst can be inactivated by treating with an agent such as a lower alcohol such as ethanol or methanol, the mixture then separated, and the polymer isolated. The polymer recovered can be purified as desired by such as drying under vacuum, and the like. The polymeric product can be treated for removal of solubles by contacting it with hot n-hexane, n-heptane, etc., which dissolves the soluble amorphous material and leaves a white, solid, predominantly crystalline polymer as the final product.

EXAMPLES

The examples provided are designed to assist one skilled in the art to a further understanding of the invention, without limiting the scope of the invention. Particular reactants, components, ratios, conditions employed, are intended to be exemplary, and not limitative of the reasonable scope of the invention herein described, of which these examples are a part of my overall disclosure.

container. The polymer was isolated and dried at ambient conditions.

The quantities and/or atom or mole ratios of the compounds employed and the results obtained are given in the Table.

Productivity is based on the polymer recovered from the reactor, i.e., the solid substantially crystalline polymer plus the xylene-soluble polymer. Propylene-soluble is not included. Productivity is given in terms of grams polymer recovered from the reactor per gram titanium per hour. Xylene-soluble polymer is the amount of the polymer recovered from the reactor (excluding propylene solubles) that remains in solution after the recovered polymer sample is dissolved in hot xylene and then cooled to room temperature. Propylene soluble material is the amount of dissolved polymer that is made during the reaction and remains dissolved in the propylene diluent. It is determined from the reactor effluent by separating the propylene solution liquid from the solid polymer, flashing off the propylene, and weighing the residue.

TABLE

Polymerization of Propylene

| | Catalyst Component (A) | | | | | Atomic and Mole Ratios | | | | Productivity Ti/Hour | Total Polymer induced g | Solid Polymer induced g | Xylene Insoluble mer g | Solubles[5] wt. % | |
|---|---|---|---|---|---|---|---|---|---|---|---|---|---|---|---|
| Run No. | mg | milli-oms Ti | DIBA-H mm[1] | BC mm | DEAC mm | Al[2]/Ti | Al[3]/Ti | DIBA-H BC | + DEAC BC | | | | | Xylene | pyl-ene |
| 1 | 98.1 | 0.186 | 9.37 | 3.77 | 0 | 50.0 | na[4] | 2.48 | na | 15,300 | 80 | 75 | 65.8 | 12.2 | 6.3 |
| 2 | 105.6 | 0.200 | 9.37 | 2.96 | 0 | 47.6 | na | 3.17 | na | 42,500 | 252 | 223 | 190 | 14.8 | 11.5 |
| 3 | 98.9 | 0.188 | 9.37 | 2.96 | 2.96 | 3.30 | 66.7 | 3.17 | 4.28 | 88,500 | 486 | 437 | 341 | 22.0 | 10.0 |

[1]mm = millimoles.
[2]Aluminum resulting from DIBA-H alone.
[3]Aluminum resulting from DIBA-H plus DEAC.
[4]na = not applicable.

[5]Solubles calculated as $\frac{\text{solid polymer-xylene insoluble}}{\text{solid polymer}} \times 100$; or $\frac{\text{Total polymer (solid polymer + xylene soluble + propylene soluble)} - \text{propylene insoluble}}{\text{total polymer}} \times 100$.

Examples

Catalyst component (A) was prepared by adding 46.5 g of a 1:1 molar ratio complex of titanium tetrachloride and ethyl benzoate, and 83.5 g of magnesium chloride which had been dried at 800° F. (426° C.) for 6 hours and ball-milled for 5 days in a vibrating mill, to a 2 liter procelain jar mill containing about 5 kilos of ½" (1.27 cm) stainless steel balls. The jar and its contents were rotated for 6 days after which the jar was removed, placed in a dry box, where the milled product was removed and stored.

Catalyst component (B) consisted of diethylaluminum chloride DEAC, diisobutylaluminum hydride DIBAH, and butyl Carbitol BC (diethyleneglycol monobutyl ether). In the control runs, diethylaluminum chloride component was omitted.

In a series of runs, a dry, air-free, 1 gallon (3.8 liter) stirred, stainless steel reactor was individually charged at room temperature (about 25° C.) under a gaseous propylene flush with catalyst component (B), catalyst component (A), about 0.9 liters of hydrogen (STP), and liquid propylene sufficient to fill the reactor about ⅓ full. The reactor and contents were heated to 150° F. (66° C.) as additional propylene was added to make the reactor liquid full and polymerization was allowed to continue for 1 hour at that temperature with intermittent addition of further propylene as required to maintain the reactor liquid full.

The reactor and contents then were cooled to about 70° F. (21° C.), 10 cc of methanol was added and mixed with the contents, and the mixture discharged into a Inspection of the results reveals that a fairly active polymerization system is obtained in control Runs 1 and 2 and particularly in Run 2 when the DIBA-H/BC mole ratio is increased from about 2.5 in Run 1 to about 3.2. As invention Run 3 demonstrates, the addition of about 3.3 millimoles of DEAC to component 2, thus increasing the mole ratio of organoaluminum compounds to butyl carbitol from about 3.2 to about 4.3, more than doubles productivity of the catalyst system. Somewhat less propylene soluble material is produced in Run 3 than in control Run 2. Although more xylene soluble polymer is produced in the presence of DEAC in Run 3, it is seen that the amount of insoluble polymer produced per unit time is substantially greater, i.e. 341 g/hour in the invention runs vs. 190 g/hour for control Run 2.

The disclosure, including data, illustrate the value and effectiveness of my invention. The examples, the knowledge and background of the field of the invention and general principles of chemistry and other applicable sciences, have formed the basis from which the broad descriptions of the invention including the ranges of conditions and generic groups of operant component have been developed, which have formed the basis for my claims here appended.

I claim:

1. A process for the polymerization of at least one alpha-monoolefin monomer which comprises polymerizing said at least one alpha-monoolefin monomer under polymerization conditions employing the catalyst system consisting essentially of (A) a milled admixture of effective ratios of a titanium halide, anhydrous magnesium or manganous chloride, optionally, with a Lewis base, and (B) effective ratios of at least one dihydrocarbylaluminum halide, at least one dihydrocarbylaluminum hydride, and an ether-alcohol, employing catalytically effective ratios of said (A):(B).

2. The polymerization process according to claim 1 wherein said titanium halide is a di-, tri- or tetrahalide of titanium.

3. The polymerization process according to claim 2 wherein said titanium halide is represented by $TiX_{4-n}R'_n$, wherein X is a halogen and is bromine, chlorine, or iodine, R' is an alkyl, cycloalkyl, cycloalkoxy, aryl, aryloxy, or alkoxy radical of 2 to 8 carbon atoms, and n is zero or an integer of 1, 2 or 3.

4. The polymerization process according to claim 3 wherein said titanium halide is titanium tetrachloride, trichloro-n-octyl titanium, dibromodimethyl titanium, iodotriethoxy titanium, trichlorophenoxytitanium, tribromocyclohexyltitanium, trichlorohexyloxytitanium, or mixture.

5. The polymerization process according to claim 2 wherein said Lewis base is an amine, amide, ether, carboxylic acid, ester, ketone, nitrile, or phosphine.

6. The polymerization process according to claim 5 wherein said Lewis base is an aliphatic carboxylic acid, aromatic carboxylic acid, alkylester of aliphatic carboxylic acid, alkylester of aromatic carboxylic acid, aliphatic ether, aromatic ether, aliphatic ketone, aromatic ketone, aliphatic aldehyde, aliphatic alcohol, aromatic alcohol, aliphatic acid halide, aliphatic nitrile, aromatic nitrile, aliphatic, amine, aromatic amine, aliphatic phosphine, aromatic phosphine, amide, combination, or a mixture.

7. The polymerization process according to claim 6 wherein said Lewis base is an ester, wherein said ester is an ester of an aliphatic alcohol with an aromatic carboxylic acid represented by the formula:

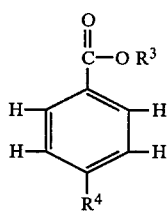

wherein $R^3$ is an alkyl group of 1 to 4 carbon atoms, $R^4$ is a para-substituent on the ring and is a monovalent radical selected from —F, —Cl, —Br, —I, —OH, —$OR^2$, —$OOCR^2$, —SH, —$NH_2$, —$NHR^2$, —$NR_2^2$, —$NHCOR^2$, —$NR^2COR^2$, $NO_2$, —CN, —CHO, —$COR^2$, —$COOR^2$, —$CONH_2$, $CONR_2^2$, —$SO_2R^2$, —$CX'_3$ wherein X'=F, Cl, Br, I or hydrogen, and wherein $R^2$ is a hydrocarbon radical selected from alkyl, cycloalkyl, and aryl of up to 12 carbon atoms.

8. The polymerization process according to claim 7 wherein said Lewis base is triethylamine, triphenylamine, diphenylamine, acetamide, butyramide, acetanilide, acetic acid, benzoic acid, dimethyl ether, diethyl ether, ethylbutylether, diphenyl ether, acetone, methyl n-butyl ketone, acetophenone, acetonitrile, iosbutyronitrile, benzonitrile, tributylphosphine propyl-(n-pentyl)-phosphine, triphenylphosphine, ethyl benzoate, ethyl anisate (p-methoxybenzoate), ethyl p-dimethylaminobenzoate, ethyl p-fluorobenzoate, ethyl p-cyanobenzoate, methyl benzoate, isopropyl p-diethylaminobenzoate, butyl p-fluorobenzoate, n-propyl p-cyanobenzoate, ethyl p-trifluoromethylbenzoate, methyl p-hydroxybenzoate, ethyl p-methoxycarbonylbenzoate, methyl p-acetylbenzoate, isopropyl p-formylbenzoate, methyl p-nitrobenzoate, ethyl p-carbamoylbenzoate, methyl p-mercaptobenzoate, methyl-p-chlorobenzoate, n-butyl-p-bromobenzoate, isopropyl-p-iodobenzoate, ethyl-p-aminobenzoate, n-propyl-p-methylaminobenzoate, methyl-p-acetamidobenzoate, n-butyl-p-formylbenzoate, dimethyl terephthalate, ethyl-p-(N,N-dimethylcarbamoyl)benzoate, n-propyl-p-(methylsulfonyl)benzoate, methyl-p-trifluoromethylbenzoate, ethyl-p-acetoxybenzoate, or mixtures thereof.

9. The polymerization process according to claim 8 wherein said Lewis base is ethyl anisate or ethylbenzoate.

10. The polymerization process according to claim 2 wherein said (B) dihydrocarbylaluminum compounds are represented by $AlR_2^5X'$, wherein $R^5$ is an alkyl radical of 1 to 12 carbon atoms, and X' is fluorine, chlorine, bromine, iodine or hydrogen.

11. The polymerization process according to claim 10 wherein said dihydrocarbylaluminum compounds are selected from the group consisting of dimethylaluminum bromide, diethylaluminum chloride, diisopropylaluminum iodide, diisobutylaluminum hydride, di-(2-ethylhexyl)aluminum chloride, di-n-dodecylaluminum hydride, such that said (B) component includes at least one halide and at least one hydride.

12. The polymerization process according to claim 2 employing a molar ratio of about 0.5:1 to 4:1 titanium halide:Lewis base in said component (A).

13. The polymerization process according to claim 2 wherein said etheralcohol is a monoalkyl ether of ethylene glycol or diethylene glycol, wherein the alkyl groups each contains 1 to 4 carbon atoms.

14. The polymerization process according to claim 13 wherein said etheralcohol is 2-methoxyethanol, 2-ethoxyethanol, 2-n-butoxyethanol, 2-(2-methoxyethoxy)ethanol, 2-(2-ethoxyethoxy)ethanol, 2-(2-n-butoxyethoxy)ethanol, and mixtures.

15. The polymerization process according to claim 2 employing an atom ratio of aluminum in the dihydrocarbylaluminum hydride plus the dihydrocarbyl aluminum halide to the titanium of about 10:1 to 250:1, and a mole ratio of dihydrocarbylaluminum hydride plus dihydrocarbylaluminum halide to the ether-alcohol of about 0.5:1 to 10:1.

16. The polymerization process according to claim 15 employing an atom ratio of aluminum in the dihydrocarbylaluminum hydride plus the dihydrocarbylaluminum halide to the titanium of about 25:1 to 150:1; and a mole ratio of dihydrocarbylaluminum hydride plus dihydrocarbylaluminum halide to the etheralcohol of about 1:1 to 5:1.

17. The polymerization process according to claim 16 wherein said etheralcohol is 2-(2-n-butoxyethoxy)ethanol.

18. The polymerization process according to claim 16 wherein said manganous or magnesium chloride is magnesium chloride, said catalyst includes said Lewis base, said Lewis base is an ester and is ethylanisate, said titanium halide is titanium tetrachloride, said dihydrocarbylaluminum halide is diethylaluminum chloride, said dihydrocarbylaluminum hydride is diisobutylaluminum hydride, and said ether-alcohol is diethyleneglycolmonobutyl ether.

19. The polymerization process according to claim 16 wherein said manganous or magnesium chloride is magnesium chloride, said catalyst includes said Lewis base and Lewis base is an ester and is ethylbenzoate, and said titanium halide is titanium tetrachloride, said ether-alcohol is diethyleneglycol monobutyl ether, said dihydrocarbyl chloride is diethylaluminum chloride, and said dihydrocarbyl aluminum hydride is diisobutylaluminum hydride.

20. The process according to claim 1 wherein said aliphatic alpha-monoolefin is represented by $RCH=CH_2$ wherein R is hydrogen or an alkyl radical.

21. The process according to claim 20 wherein said alpha-monoolefin monomer is ethylene, propylene, butene-1, isobutylene, 3-methylbutene-1, pentene-1, hexene-1, octene-1, or admixture thereof.

22. The process according to claim 21 employing a ratio of about 0.001 to 1 weight percent catalyst component (A) relative to the total reaction mixture including catalyst and alpha-monoolefin, and further including diluent where employed.

23. The process according to claim 22 wherein said polymerization is conducted under polymerization conditions at a temperature in the range of about $-80°$ C. to $+150°$ C.

24. The process according to claim 23 further incorporating a diluent selected from n-butane, isobutane, pentane, n-hexane, n-heptane, n-octane, cyclohexane, methylcyclohexane, cyclohexane, or a mixture.

25. The process according to claim 23, further employing minor amounts of hydrogen during polymerization effective to exercise control of molecular weight of the polymer.

26. The process according to claim 22 wherein said (A) is titanium tetrachloride, magnesium chloride, and ethyl benzoate or ethyl anisate, and said (B) is diethylaluminum chloride, diisobutylaluminum hydride, and butyl Carbitol.

27. The process according to claim 26 wherein said monomer is ethylene, or ethylene with another said alpha-monoolefin.

28. The process according to claim 26 wherein said monomer is propylene.

* * * * *

UNITED STATES PATENT AND TRADEMARK OFFICE
CERTIFICATE OF CORRECTION

PATENT NO. : 4,330,648

DATED : May 18, 1982

INVENTOR(S) : M. Bruce Welch

It is certified that error appears in the above—identified patent and that said Letters Patent is hereby corrected as shown below:

Column 9, line 60, delete "7" and insert therefor --- 5 ---.

Column 10, line 38, delete "etheralcohol" and insert therefor --- ether-alcohol ---.

Column 10, line 42, delete "etheralcohol" and insert therefor --- ether-alcohol ---.

Column 10, lines 58 and 59, delete "etheral- cohol" and insert therefor --- ether-alcohol ---.

Column 10, line 61, delete "etheralcohol" and insert therefor --- ether-alcohol ---.

Signed and Sealed this

Seventeenth Day of August 1982

[SEAL]

Attest:

Attesting Officer

GERALD J. MOSSINGHOFF

Commissioner of Patents and Trademarks